United States Patent [19]

Vasile et al.

[11] Patent Number: 5,243,350
[45] Date of Patent: Sep. 7, 1993

[54] OPTICAL CONTROL OF TR MODULES

[75] Inventors: Carmine F. Vasile, Patchogue; Stanley M. Reich, Jericho, both of N.Y.

[73] Assignee: Grumman Aerospace Corporation, Bethpage, N.Y.

[21] Appl. No.: 788,373

[22] Filed: Nov. 6, 1991

[51] Int. Cl.$^5$ .............................................. G01S 13/00
[52] U.S. Cl. ..................................... 342/157; 342/372
[58] Field of Search ................ 342/368, 372, 175, 157

[56] References Cited

U.S. PATENT DOCUMENTS 4,885,589 12/1989 Edward et al. ...................... 342/175
4,967,201 10/1990 Rich, III .............................. 342/175
5,089,832 2/1992 Vasile .................................. 342/383

Primary Examiner—Theodore M. Blum
Attorney, Agent, or Firm—Pollock, Vande Sande & Priddy

[57] ABSTRACT

Prior art arrays of TR modules suffer from the disadvantage of requiring heavy and bulky waveguides or coaxial cables to provide controls therefore. In the present system, by using incoherent light to coherently synchronize the different TR modules of the array to produce a coherent phase array, the bulky waveguides and coaxial cables no longer are needed. To provide for the coherent synchronization of the phase array, oscillator and control signals are multiplexed onto different incoherent optical signals. The multiplexed optical signals are then summed and sent, via an optical fiber, to the TR modules of the array. At each of the TR modules, the oscillator signal and a corresponding control signal are separated from the summed optical signal and are used to weight the phase and amplitude of the radar signal to be transmitted from the TR module. When the properly synchronized and weighted modulated radar signal is sent from each of the TR modules, a coherently synchronized radar signal is produced.

20 Claims, 2 Drawing Sheets

OPTICAL CONTROL OF TR MODULES

FIELD OF THE INVENTION

The present invention relates to transmitter receiver (TR) modules which operate over a broad frequency range, and more particularly to methods and apparatus for optically synchronizing the TR modules such that the signals output therefrom are immune to interference.

BACKGROUND OF THE INVENTION

TR modules are used to transmit and receive signals. Typically, such TR modules are used to generate and receive RF energy, usually in the form of a radar signal. In a phase array type radar system, a plurality of TR modules are used. Presently, to distribute signals to the different TR modules, waveguides or coaxial cables, depending on the application, are used. These waveguides and coaxial cables are quite heavy and bulky.

Signals can also be optically distributed to different TR modules. However, in so doing, coherent light has to be used. Yet the use of a coherent light has many pitfalls. Elaborating, to modulate coherent light, respective wavelengths having different frequencies are needed. Such modulation is extremely complex and requires that the physical dimensions of the polarization and transmission paths be held very stable, over the normal temperature change and mechanical stress in the environment. Thus, in an environment such as an aircraft which may be maneuvering at different speeds and directions, the physical dimensions of the optical system, in using coherent light, have to have physical tolerences in the order of wavelengths of the light that is being used. Needless to say, it is extremely difficult to achieve this mechanically.

BRIEF DESCRIPTION OF THE PRESENT INVENTION

To control each TR module in an array of TR modules, a combination of oscillator and information control signals is used. To provide interference-free transmission of this combination of signals to the respective TR modules, the signals are multiplexed onto different optical signals, which are then summed and transmitted to the respective TR modules, by means of an optical fiber. The to-be-transmitted radar signal, in the meantime, can be sent to the respective TR modules in a number of ways.

At each of the TR modules, at the end of the transmitting optical fiber, the summed optical signal is received by a lens, which acts as a collector and focuses the optical signal to a wave-length division demultiplexer, which separates the oscillator signal and a corresponding control signal. The thus separated local oscillator signal and control signal are then routed to a mixer and a decoder, respectively, both of which are resident in the TR module. By means of the decoder, the information carried by the control signal is deciphered and appropriate control of the TR module is effected.

In the mixer, the radar signal is modulated by the local oscillator signal so that the phase and amplitude of the radar signal, for that particular TR module, is weighted relative to the other TR modules. And inasmuch as the same oscillator signal is used for all of the TR modules, a synchronized radio frequency (RF) signal, which results from combining the modulated radar signals from the respective TR modules, can be transmitted from the array of TR modules to an of-interest target, via respective antennas associated with each of the TR modules.

Switches are also incorporated within each of the TR modules of the array to effectuate the TR modules as receivers for receiving the echo reflected from the target. When acting as a receiver, each TR module would modulate the echo signal with the oscillator signal in the mixer, so that a synchronized down modulated signal is returned to the processing center for ascertaining the location of the target.

The present invention, therefore, is able to accomplish the objective of providing a synchronizing oscillator signal to the respective TR modules of an TR array to be mixed with a radar (IF) signal to generate a to-be-transmitted RF signal.

It is also an objective of the present invention to use incoherent optics, as opposed to coheren optics, to eliminate the problem of having to maintain very precise tolerances in an optical distribution system.

It is yet another objective of the present invention to provide a distribution system that does not require bulky and heavy waveguides or coaxial cables.

The above-mentioned objectives and advantages of the present invention will become more apparent and the invention itself will be best understood by reference to the following description of an embodiment of the invention taken in conjunction with the accompanying drawings, wherein:

DETAILED DESCRIPTION OF THE PRESENT INVENTION

Figure 1:
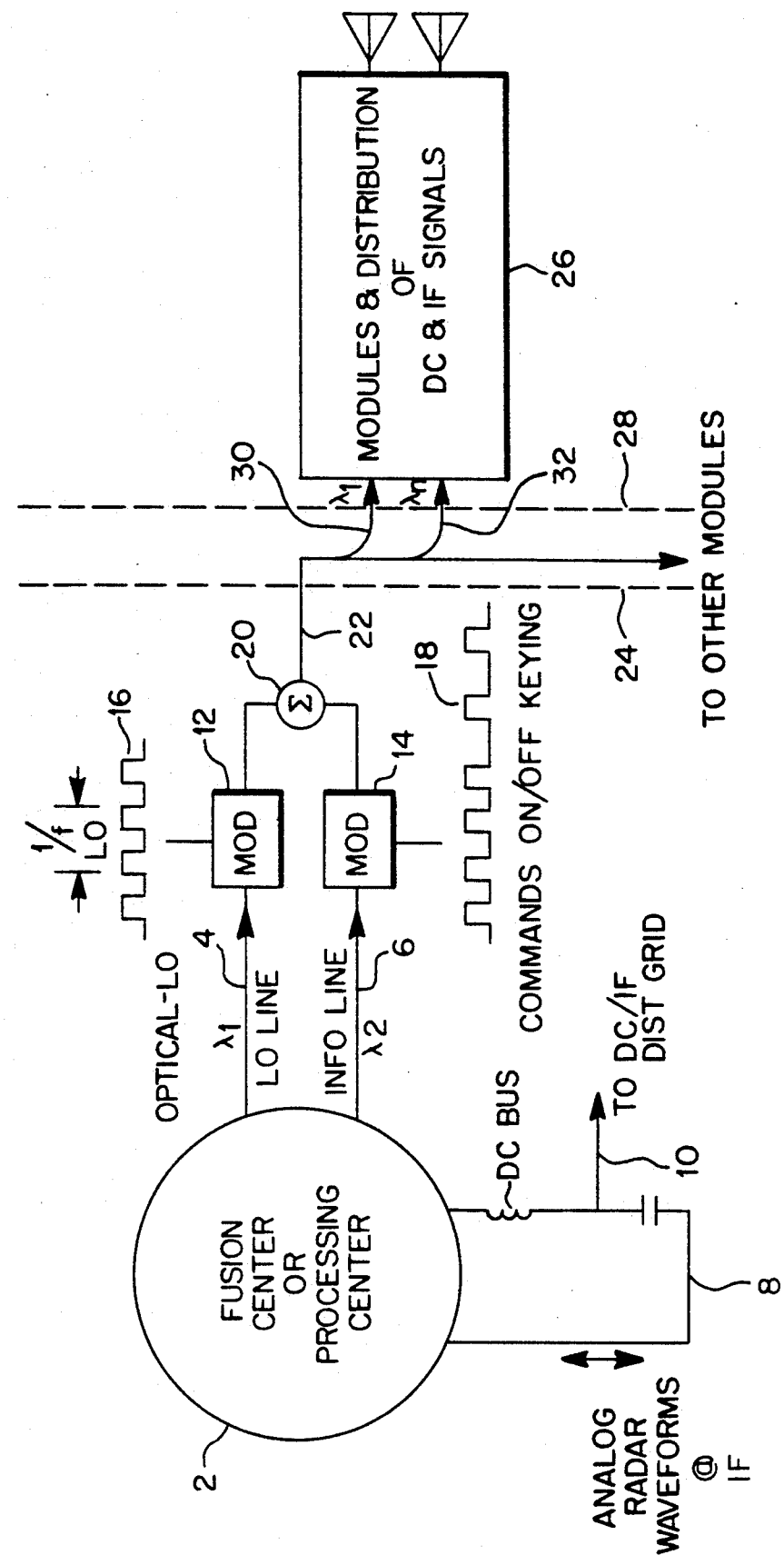
FIG. 1 is a simplified block diagram of the overall system of the instant invention.

Referring to FIG. 1, there is shown a fusion center, or processing center, 2 which contains the equipment to generate different signals and to calculate a received RF signal, in order to determine the location of a target in a radar application. The different signals generated include a local oscillator signal, a radar signal a, plurality of optical signals and at least one command signal which includes a plurality of control signals. Moreover, a plurality of control signals independent of the command signal can be directly generated. A typical fusion center is described in publication "Radar Handbook" by Merrill Skolnick, 2nd Ed, 1990, Chapter 5.

Briefly, resident in fusion center 2 are processing means, such as processors, and at least one laser light source, such as a semiconductor diode laser, used to generate an optical signal. By using a number of laser beams, or by putting a number of different filters, or modulators, at the output of the laser source, a number of different optical signals can be provided as outputs from fusion center 2. There is multiplexed, or superimposed, onto one of the optical signals an oscillator signal, also generated within fusion center 2. Multiplexed onto other optical signals is a corresponding plurality of control signals each of which contains information for operating a corresponding TR module.

Alternatively, instead of multiplexing different optical signals with corresponding control signals, only one other optical signal, which is not the same optical signal multiplexed with the oscillator signal, may need to be multiplexed with the command signal, which has a plurality of control signals. Each of the control signals has an address that is recognizable by only one of the TR modules.

In the embodiment of FIG. 1, the alternate approach of multiplexing a command signal having a plurality of control signals onto a single optical signal is shown, as there are shown only two optical lines $\lambda_1$ and $\lambda_2$, designated as 4 and 6, respectively, outputting from fusion center 2. For this embodiment, line 4 is referred to as the local oscillator line and line 6 is referred to as the information line.

Oscillator line 4 is used to transmit an optical signal having multiplexed thereon the oscillator signal. This oscillator signal, in essence, is a clocking signal generated within fusion center 2.

Although only one information line 6 is shown, there may actually be a number of lines, corresponding to the number of TR modules in the array if the approach of multiplexing different control signals on different optical signals is used. If there is a plurality of information lines 6, each of the information lines would carry a particular optical signal having multiplexed thereon a corresponding control signal. Each of the information lines is connected to one of the TR modules present in the array. The control signals multiplexed onto the respective information lines contain information to operate the respective TR modules, including designating whether they be operating as transmitter or receiver modules and how much weight to put on the respective amplitudes and phases of the modulated radar signals generated by the TR modules. It should be appreciated, therefore, that even though only one information line 6 is shown, a plurality of information lines, corresponding to a number of TR modules in the array, may also be used.

Also generated within fusion center 2 is an analog radar signal which, for this invention, may also be designated as an intermediate frequency (IF) signal. As shown, the analog radar signal is sent onto line 8 from fusion center 2, and through line 10 to each of the TR modules. The transmission of the analog radar signal to the respective TR modules may be carried out a number of ways, including optical transmission, through coaxial cables, or through a power supply line, as in the case of wireless intercoms. For the embodiment shown, the last mentioned transmission method is used. Therefore, a DC bus biasing the radar signal is provided.

Returning to the FIG. 1 embodiment illustrated by oscillator line 4 and only one information line 6, it can be seen that these lines are connected to respective modulators 12 and 14. Modulators 12 and 14 are conventional type of modulators and are used to modulate the respective signals from oscillator lines 4 and 6 with pulse trains 16 and 18, respectively. It should be appreciated that pulse train 6 has a predetermined static frequency whereas pulse train 18 has a frequency which varies.

After modulation, the respective optical signals, having multiplexed thereon the oscillator and control signals, are summed by a summer 20, which in reality is a wavelength multiplier, onto a single optical fiber 22.

Optical fiber 22 provides connection for the summed optical signal to the respective TR modules, represented by block 26, which is to the right of dotted line 28. The space between dotted lines 24 and 28 is meant to show that the distance separating TR module block 26 and fusion center 2 can vary. Moreover, it can be seen that optical fiber 22 is subdivided into additional optical fibers, such as 30 and 32, for transmitting the summed optical signal containing the respective oscillator and control signals to the respective TR modules.

Figure 2:
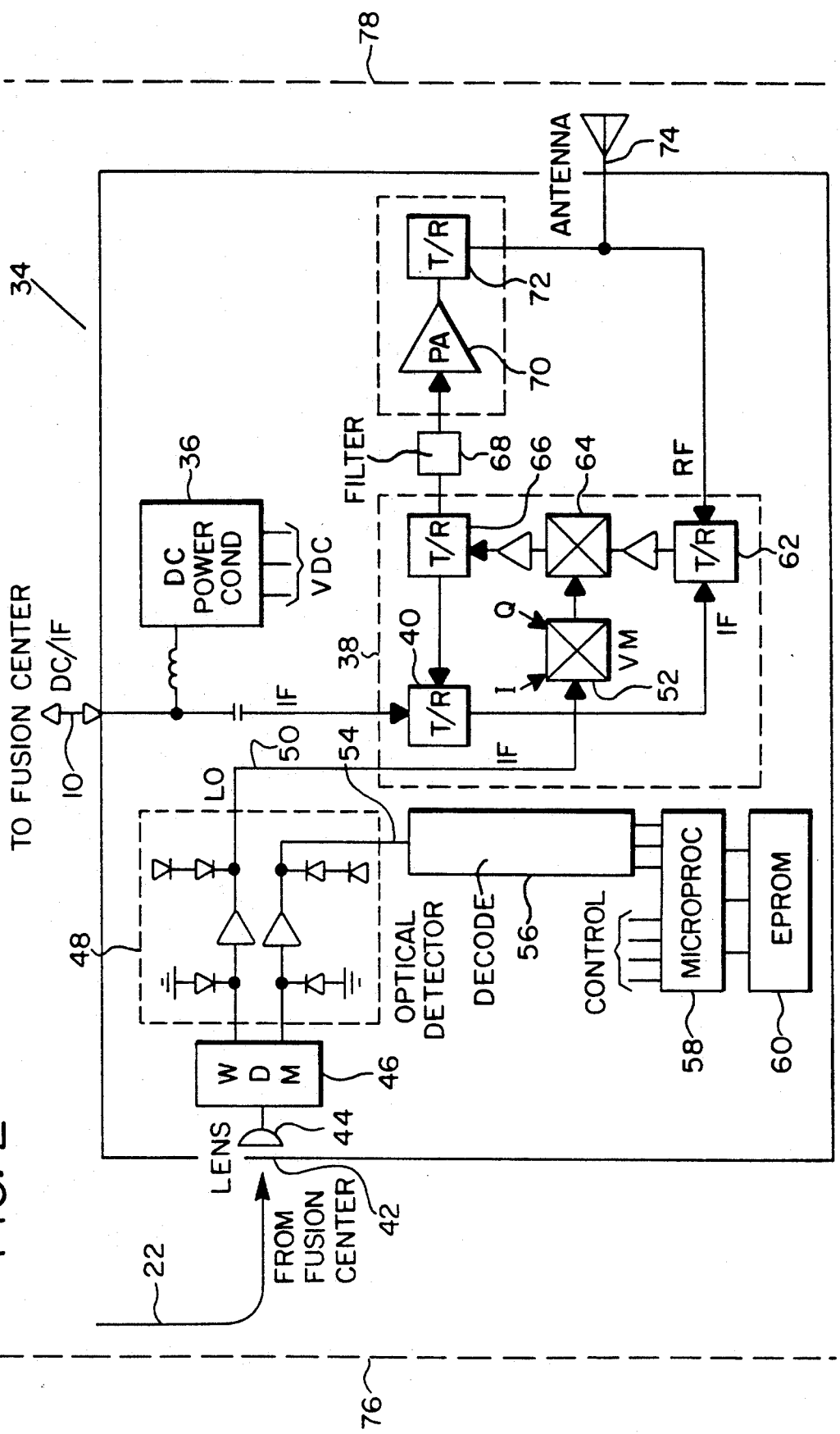
FIG. 2 is a block diagram of one of the TR modules.

FIG. 2 is a simplified block diagram of a TR module 34. As shown, the IF radar signal is transmitted from fusion center 2 to TR module 34 via line 10. Since the radar IF signal is sent to TR module 34 by being superimposed onto a power supply line, a DC power conditioner 36 is required to remove the IF radar signal from the power. This separated IF radar signal is then sent to a mixer 38, and more specifically, to a T/R switch 40 within mixer 38.

At the same time, through optical fiber 22, the optical signal having the set of oscillator and control signals multiplexed thereon is being received by TR module 34 at junction 42. Although optical fiber 22 is shown to end at junction 42, a conventional focusing lens (not shown) may be added to the terminal portion of optical fiber 22. Opposite to the terminal portion of optical fiber 22 and within TR module 34 is a graded index optic collecting lens 44 which acts to receive the optical signal transmitted through optical fiber 22. Lens 44 is a conventional lens and is made by Nippon Sheet Glass Company (NSG) of Japan. Lens 44 is connected to and acts to focus the optical signal onto a conventional wavelength division demultiplexer 46, which separates the oscillator signal and the corresponding control signal from the received summed optical signal.

The outputs of wavelength division demultiplexer 46 are provided as inputs to an optical detector 48, which is made by a number of companies including Motorola, Hewett-Packard and Tachonics. Optical detector 48, in essence, accepts the separated oscillator and control signals, which are still in the form of an optical signal, and converts the same to corresponding electrical signals. For the oscillator signal, a corresponding electrical signal is transmitted via line 50 to mixer 38, and more specifically to a phase shifting modulator 52, such as a conventional vector modulator. The electric signal representative of the control signal, provided at the output of optical detector 46, is sent via line 54 to a decoder 56. There, the control signal is deciphered and the information contained therein is sent to a microprocessor 58 which, in response to the information, obtains particular characteristics, such as phase and amplitude, from its associated Eprom memory 60, to provide control signals to TR module 34.

Although not shown, these control signals from microprocessor 58 are used, in conjunction with the oscillator signal, to weight the characteristics, such as the amplitude and phase, of the radar signal in mixer 38 which is associated with TR module 34.

By following the paths within mixer 38, it can be seen that the radar IF signal is sent from T/R switch 40 to another T/R switch 62 before being sent to a multiplier 64. The oscillator signal, having been weighted, in terms of its amplitude and phase (shown by the in-phase I and quadrature Q components) of phase shifting modulator 52, is also sent to multiplier 64 where it is modulated with the radar IF signal. The thus modulated radar signal is next sent to yet another T/R switch 66 and fed through a filter 68, a power amplifier 70 and another T/R switch 72, before being transmitted as a synchronized RF signal to the ambient environment through antenna 74.

With reference to the overall system shown in FIG. 1, it should be appreciated that there is a plurality of TR modules which are simular to TR module 34 present in the system. Each of these TR modules operates in the same fashion as was discussed with respect to TR module 34. Yet because different weighting and control signals are provided to the different TR modules and only one oscillator signal is provided to all of the TR modules means that each of the TR modules is synchronized to the master oscillator in fusion center 2 used to generate the oscillator signal. Putting it differently, an optical clock which provides oscillator signals, which are impervious to interference, for synchronizing the different TR modules, so that a coherently synchronized radar signal, which is a combination of the respective modulated IF signals sent out from the corresponding antennas of the respective TR modules, is effected and directed from the array of TR modules to the of-interest target. And since the respective control signals for the corresponding TR modules are generated in fusion center 2, the amplitudes and phases of the respective modulated radar signals from the different TR modules can be related and coherently controlled by the incoherent optical signals.

On receiving an echo signal which is representative of the target, after the same has been impinged by the coherently synchronized radar signal, the respective portions of the echo signal are down modulated by the respective TR modules of the array with the oscillator signal and sent back to fusion center 2. When the different portions of the echo signals are combined in fusion center 2, the angular location of the target can be ascertained.

Inasmuch as the present invention is subjected to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the appended claims.

We claim:

1. A method of controlling a TR module, comprising the steps of:
   sending a radar signal to the TR module;
   multiplexing onto an optical signal an oscillator signal;
   multiplexing onto another optical signal a command signal to control the TR module;
   summing the respective optical signals onto an optical fiber;
   sending the summed optical signal, having the oscillator and command signals multiplexed thereon, to the TR module via the optical fiber;
   separating the summed optical signal into the oscillator signal and the command signal within the TR module;
   linearly modulating the radar signal with the oscillator signal; and
   utilizing the command signal to adjust characteristics of the modulated radar signal, the thus adjusted modulated radar signal being transmitted from the TR module, via an antenna, toward a target.

2. The method of claim 1, further comprising the step of:
   using a lens within the TR module to collect the summed optical signal being sent.

3. The method of claim 1, wherein the linearly modulating step further comprises the step of:
   using a phase shifting modulator to modulate the amplitude and phase of the radar signal.

4. The method of claim 1, wherein the separating step comprises the steps of:
   demultiplexing the summed optical signal into the oscillator and command signals;
   routing the oscillator signal to a phase shifting modulator for modulating the phase and amplitude of the radar signal; and
   routing the command signal to a decoder for deciphering the controls written into the command signal to control and transmit the modulated radar signal, via the antenna, toward the target.

5. The method of claim 1, further comprising the steps of:
   receiving, via the antenna of the TR module, a signal of an echo of the transmitted radar signal representative of the target;
   down modulating the received echo signal with the oscillator signal; and
   transmitting the down modulated echo signal to a processing means to determine the location of the target.

6. A method of synchronously controlling an array of TR modules, comprising the steps of:
   sending a radar signal to the respective TR modules of the array;
   multiplexing onto an optical signal an oscillator signal;
   multiplexing onto at least one other optical signal a command signal having a plurality of control signals each recognizable and to be used by a corresponding one of the TR modules of the array;
   summing the respective optical signals onto an optical fiber;
   sending the summed optical signal having the oscillator and command signals multiplexed thereon to the array of TR modules via the optical fiber;
   wherein for each TR module:
   separating from the summed optical signal the oscillator signal and a corresponding recognized control signal from the command signal;
   linearly modulating the radar signal with the oscillator signal to generate a modulated radar signal having characteristics correlating to the TR module;
   utilizing the corresponding recognized control signal to provide the modulated radar signal with at least synchronized phase and amplitude characteristics which relate to corresponding characteristics of the respective modulated radar signals being generated in the other TR modules;
   wherein the respective radar signals sent via respective antennas from all of the TR modules, in combination, effect a coherently synchronized radar wave front to be transmitted to an of interest target.

7. The method of claim 6, wherein the linearly modulating step comprises the step of:
   using a phase shifting modulator to modulate the amplitude and phase of the radar signal.

8. The method of claim 6, further comprising step of:
   using a lens in each of the TR modules to collect the summed optical signal sent thereto.

9. The method of claim 6, further comprising the steps of:
   receiving, via the respective antennas of the TR modules, corresponding signals of an echo of the transmitted coherently synchronized radar wave front representative of the of interest target;

down modulating the received echo signals with the corresponding oscillator signals to generate corresponding down modulated echo signals; and transmitting the corresponding down modulated echo signals to a processing means to determine the location of the of interest target.

10. Apparatus for controlling a TR module, comprising:

processing center including means for generating a radar signal, a plurality of optical signals, an oscillator signal and a control signal;

means for transporting the radar signal to the TR module;

means for multiplexing the oscillator signal onto an optical signal;

means for multiplexing the control signal onto another optical signal;

means for summing the multiplexed optical signals onto an optical fiber for transmission to the TR module;

demultiplexer means within the TR module for separating the oscillator signal and the control signal from the summed optical signal;

means within the TR module for linearly modulating the radar signal with the oscillator signal;

means for decoding the control signal to provide information to adjust characteristics of the modulated radar signal so that an appropriate modulated radar wave front can be transmitted, via an antenna associated with the TR module, toward a target.

11. The apparatus of claim 10, wherein each of the multiplexing means comprises:

a modulator for amplitude modulating the respective optical signal with a corresponding predetermined pulse train.

12. The apparatus of claim 11, wherein the summing means comprises:

an optical wavelength division multiplexer for summing the respective optical signals onto which the respective oscillator and control signals are multiplexed, the summed optical signal being transmitted to the TR module.

13. The apparatus of claim 10, wherein the demultiplexer means comprises:

an optical wavelength division demultiplexer within the TR module for separating the oscillator signal and the corresponding control signal from the summed optical signal.

14. The apparatus of claim 10, further comprising:

optical detector means within the TR module for receiving the separated oscillator and control signals and for directing the same to the linearly modulating means and the decoding means, respectively.

15. The apparatus of claim 10, further comprising:

switching means working in cooperation with the TR module to activate the latter to act as a receiver for receiving, via the antenna, a signal representative of an echo of the target hit by the transmitted modulated radar wave front, the echo signal being linearly down modulated with the oscillator signal and transmitted to the processing center for determining the location of the target.

16. The apparatus of claim 13, further comprising:

a lens within the TR module for collecting the sent summed optical signal from the optical fiber, the thus collected signal being then transmitted to the optical wavelength division demultiplexer.

17. Apparatus for synchronously controlling an array of TR modules, comprising:

a processing center including means for generating a plurality of optical signals, an oscillator signal, a command signal having a plurality of control signals and a radar signal;

means for transporting the radar signal to each of the TR modules of the array;

means for multiplexing the oscillator signal onto one optical signal;

means for multiplexing onto at least one other optical signal the command signal having the plurality of control signals each being recognizable and to be used in a corresponding one of the TR modules;

means for summing the respective optical signals into a summed optical signal and sending the summed optical signal via fiber optics to each of the TR modules;

wherein each of the TR modules includes:

means for receiving the sent summed optical signal;

demultiplexing means for separating the oscillator signal and a corresponding recognized control signal of the command signal from the received summed optical signal;

modulator means for linearly modulating the radar signal with the oscillator signal to generate a modulated radar signal having amplitude and phase corresponding to the TR module;

decoder means for decoding the corresponding recognized control signal to provide the modulated radar signal with the amplitude and phase which synchronously relate to corresponding amplitudes and phases of the respective modulated radar signals being generated in the other TR modules of the array;

wherein the respective modulated radar signals, being sent by respective antennas from all of the TR modules, in combination, effect a coherently synchronized radar wave front for transmission to an of interest target.

18. The apparatus of claim 17, wherein the oscillator signal multiplexing means comprises:

a modulator for amplitude modulating the one optical signal with a predetermined pulse train; and wherein the command signal multiplexing means comprises:

another modulator for amplitude modulating the other optical signal with another predetermined pulse train.

19. The apparatus of claim 17, further comprising:

switching means working in cooperation with each of the TR modules to activate the corresponding TR module to act as a receiver for receiving, via the corresponding antenna, a signal representative of an echo of the target hit by the coherently synchronized radar wave front, the echo signal being linearly down modulated with the corresponding oscillator signal and transmitted to the processing center to combine with the down modulated echo signals from the other TR modules to calculate the location of the target.

20. The apparatus of claim 17, wherein for each TR module, for demultiplexing means comprises:

an optical wavelength division demultiplexer; and wherein each TR module further comprises:

a lens for collecting the summed optical signal sent thereto, the lens focusing the collected summed optical signal onto the corresponding optical wavelength division demultiplexer.

* * * * *